United States Patent
Lombardi et al.

(10) Patent No.: US 9,619,137 B2
(45) Date of Patent: Apr. 11, 2017

(54) PORTABLE DEVICE TOUCHSCREEN OPTIMIZATION

(71) Applicant: Motorola Mobility LLC, Chicago, IL (US)

(72) Inventors: Michael J Lombardi, Lake Zurich, IL (US); Joseph L Allore, Mundelein, IL (US); David K Lim, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 64 days.

(21) Appl. No.: 14/669,797

(22) Filed: Mar. 26, 2015

(65) Prior Publication Data
US 2016/0283079 A1 Sep. 29, 2016

(51) Int. Cl.
*G06F 3/0488* (2013.01)
*G06F 1/16* (2006.01)
*G06F 3/042* (2006.01)
*G06F 3/044* (2006.01)

(52) U.S. Cl.
CPC .......... *G06F 3/0488* (2013.01); *G06F 1/1643* (2013.01); *G06F 1/1656* (2013.01); *G06F 3/044* (2013.01); *G06F 3/0421* (2013.01)

(58) Field of Classification Search
CPC .... G06F 1/1643; G06F 1/1656; G06F 3/0421; G06F 3/044; G06F 3/0488
USPC .................. 348/335, 373; 345/173
See application file for complete search history.

(56) References Cited

U.S. PATENT DOCUMENTS

| | | | | |
|---|---|---|---|---|
| 5,873,005 A * | 2/1999 | Wakabayashi | ......... | G03B 13/12 396/379 |
| 7,969,469 B2 * | 6/2011 | Guidash | ............... | H04N 5/2258 348/207.99 |
| 8,279,544 B1 * | 10/2012 | O'Neill | ..................... | G02B 7/14 359/819 |
| 8,385,004 B2 * | 2/2013 | Hicks | ..................... | G03B 41/00 359/699 |
| 8,760,569 B2 * | 6/2014 | Yang | ..................... | G06F 1/1632 348/373 |
| 9,232,151 B1 * | 1/2016 | Azuma | ................. | H04N 5/2253 |
| 9,294,660 B2 * | 3/2016 | O'Neill | ................. | H04N 5/2254 |
| 2004/0183935 A1 * | 9/2004 | Shimano | ............. | H04M 1/0214 348/335 |
| 2007/0070184 A1 * | 3/2007 | Kim | ..................... | G06F 1/1605 348/14.02 |
| 2007/0122145 A1 * | 5/2007 | Chang | ................. | G02B 13/009 396/529 |
| 2007/0229702 A1 * | 10/2007 | Shirono | ................. | G02B 7/102 348/374 |
| 2007/0280677 A1 * | 12/2007 | Drake | ..................... | G02B 7/02 396/429 |
| 2008/0088601 A1 * | 4/2008 | Chien | ..................... | C03C 17/36 345/173 |
| 2010/0176319 A1 * | 7/2010 | Nunnink | ................. | G02B 3/14 250/566 |

(Continued)

*Primary Examiner* — Tony Davis
(74) *Attorney, Agent, or Firm* — Miller, Matthias & Hull LLP

(57) ABSTRACT

A display protection system for use in a portable electronic device includes first and second lenses overlaying the device display. The first lens includes an aperture over a lens sensor mounted in the device, whereas the second lens includes an opaque region in that same area. In this way, the lens sensor may detect the presence or absence of the secondary lens and adjust touch sensor behavior accordingly.

15 Claims, 7 Drawing Sheets

(56) References Cited

U.S. PATENT DOCUMENTS

| | | | | |
|---|---|---|---|---|
| 2010/0208132 A1* | 8/2010 | Shiraishi | H01L 27/14618 | 348/374 |
| 2010/0309316 A1* | 12/2010 | Kojima | H01L 31/0203 | 348/164 |
| 2011/0103789 A1* | 5/2011 | Honjo | G02B 7/102 | 396/530 |
| 2011/0164154 A1* | 7/2011 | Honjo | G03B 17/14 | 348/241 |
| 2011/0221948 A1* | 9/2011 | Saito | G06F 3/0488 | 348/333.01 |
| 2011/0229119 A1* | 9/2011 | Liang | H04M 1/0264 | 396/535 |
| 2012/0051732 A1* | 3/2012 | Aoki | G03B 35/10 | 396/374 |
| 2012/0105368 A1* | 5/2012 | Kobayashi | G06F 3/0416 | 345/174 |
| 2012/0120021 A1* | 5/2012 | Konishi | G06F 3/0416 | 345/174 |
| 2012/0229919 A1* | 9/2012 | Tang | G02B 13/003 | 359/754 |
| 2012/0281300 A1* | 11/2012 | Yang | G02B 13/0045 | 359/717 |
| 2013/0002611 A1* | 1/2013 | Kim | G06F 3/0425 | 345/175 |
| 2013/0064533 A1* | 3/2013 | Nakata | G03B 3/10 | 396/76 |
| 2013/0100061 A1* | 4/2013 | Kawauchi | G06F 3/0416 | 345/173 |
| 2013/0181902 A1* | 7/2013 | Hinckley | G06F 1/1684 | 345/168 |
| 2013/0258182 A1* | 10/2013 | Lin | H04N 5/2254 | 348/374 |
| 2013/0265654 A1* | 10/2013 | Yang | G02B 13/003 | 359/717 |
| 2013/0278785 A1* | 10/2013 | Nomura | H04N 5/23287 | 348/208.11 |
| 2014/0110563 A1* | 4/2014 | Yun | G01B 11/14 | 250/206.1 |
| 2014/0111430 A1* | 4/2014 | Shima | G06F 3/044 | 345/157 |
| 2014/0226300 A1* | 8/2014 | O'Neill | G03B 15/06 | 362/18 |
| 2014/0267099 A1* | 9/2014 | Blair | G06F 1/1692 | 345/173 |
| 2014/0267108 A1* | 9/2014 | Chung | G06F 3/0416 | 345/173 |
| 2014/0340341 A1* | 11/2014 | Park | G06F 3/0421 | 345/173 |
| 2015/0042877 A1* | 2/2015 | O'Neill | H04N 5/2254 | 348/376 |
| 2015/0049042 A1* | 2/2015 | Fujii | G06F 3/0416 | 345/174 |
| 2015/0054780 A1* | 2/2015 | Manba | G06F 3/044 | 345/174 |
| 2015/0241761 A1* | 8/2015 | Llewellyn | G03B 17/56 | 396/448 |
| 2016/0044232 A1* | 2/2016 | Kim | H04N 5/23212 | 348/345 |

* cited by examiner

PORTABLE DEVICE TOUCHSCREEN OPTIMIZATION

TECHNICAL FIELD

The present disclosure is related generally to mobile device construction, and, more particularly, to a system and method for improving touch screen usability in a portable communication device.

BACKGROUND

One of the most prevalent and devastating failure modes for portable communications devices (e.g., "smartphones" or high function cellular phones) is cracking of the main lens of the device when the device is dropped or struck. The main lens is typically fabricated from glass, and the cracked glass causes both cosmetic and safety problems. Moreover, for designs wherein the device touchscreen is part of the glass lens assembly, a cracked lens may result in an unusable device.

While a cracked lens may be replaceable in some cases, lens replacement is one of the most expensive repairs available for portable communication devices. This is because the lens is almost always laminated to the display module with an optically clear glue. Indeed, aftermarket industries for cases and lens covers are thriving primarily because they help users avoid cracking their main lenses. While a lens cover does offer some degree of protection, such covers are primarily manufactured of a plastic material and frequently obscure the clarity of the display. Lens covers may also cause functional issues with device proximity or light sensors, and may affect the quality of pictures taken with the device's front facing imager.

Glass lens covers can improve image clarity relative to plastic covers, but must be made considerably thicker than plastic covers for manufacturability. This thickness can lead to reduced touchscreen sensitivity due to the increased distance between the user's finger and the touch sensor. Glass lens liners also scratch easily since they reside on top of the device's lens.

While the present disclosure is directed to a system that can eliminate certain shortcomings discussed in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art in the public domain.

As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
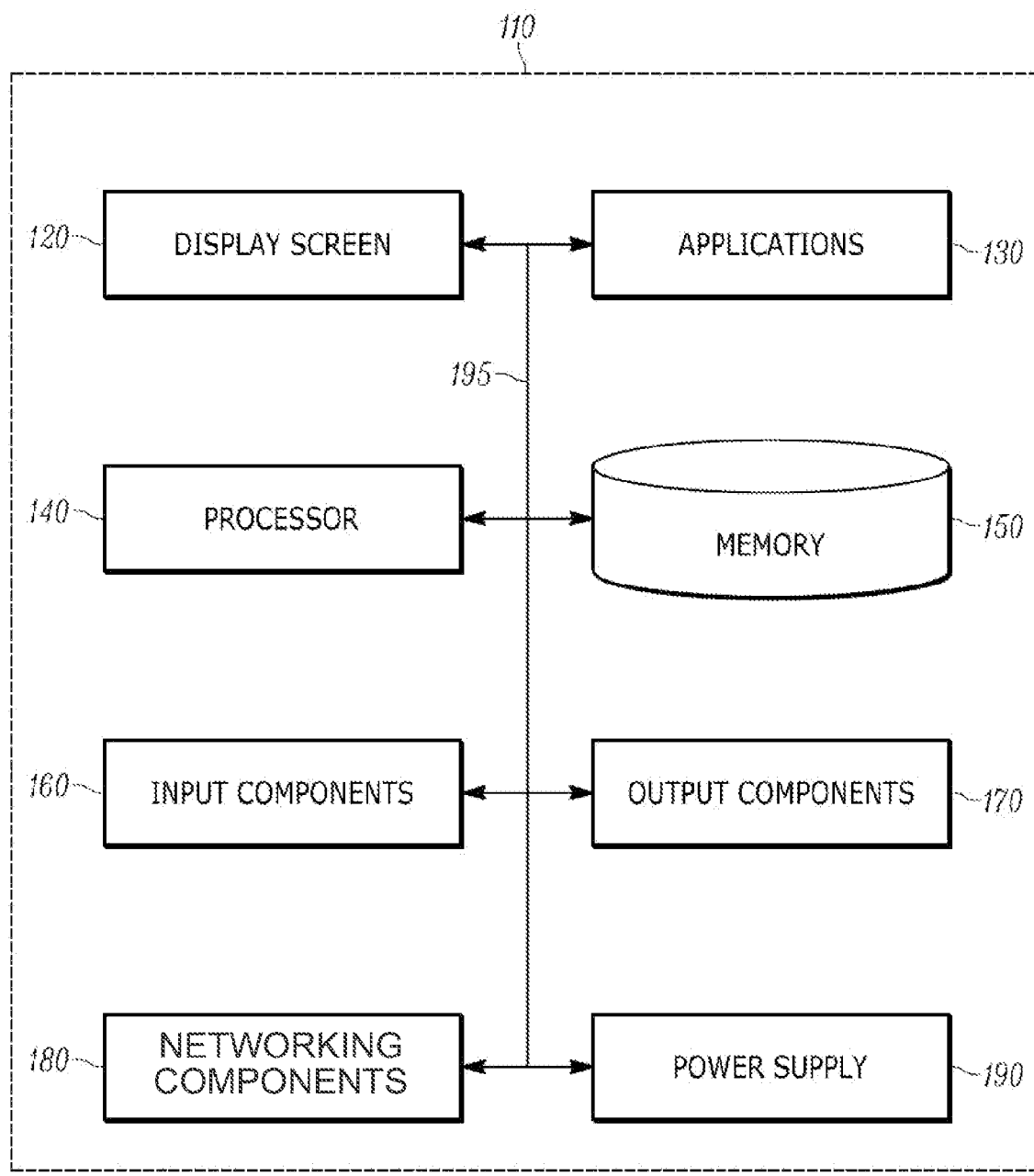
FIG. 1 is a simplified schematic of an example device with respect to which embodiments of the presently disclosed principles may be implemented.

Before presenting a full discussion of the disclosed principles, an overview of certain embodiments is given to aid the reader in understanding the later discussion. As noted above, the lenses of portable communication devices are fragile, and as such, there have been attempts to protect such lenses from damage. While plastic lens protectors are usable, a clearer view of the device display is provided by a glass lens protector. However, glass lens protectors also have drawbacks, including decreased touch sensitivity.

In an embodiment of the disclosed principles, two separate glass lenses are implemented in a portable communication device. The first glass lens is laminated to the display of the device while the second glass lens is laminated to the first lens. To prevent the second glass lens from being scratched or cracking, it is also surrounded and protected by the device's housing.

If the second lens does crack or chip, it can be removed by the user and discarded; the device remains fully functional with the first lens alone in an embodiment. A new secondary lens may later be assembled to the device if desired. Therefore, a user will expect the device to be functional with either the first lens alone or with both lenses combined. However, touchscreen sensitivity and edge performance/grip suppression may differ depending upon whether both lens covers are present or only the first lens cover is present.

Thus, in an embodiment, the touchscreen sensitivity and edge performance/grip suppression of the device are modified based on the presence or absence of the second lens. The presence of the second lens may be detected by proximity sensor, light sensor, capacitive sensor, or other means in various embodiments. In an embodiment wherein an optical sensor such as infrared proximity sensor or ambient light sensor is used, the first lens includes an optical transmission area in the same region that the second lens includes solid artwork to block light. In this way, the sensor is blocked when the second lens is assembled to the device, and the device thus detects the presence or absence of the second lens.

In response to the detected presence or absence of the second lens, the device is configured in an embodiment to alter parameters related touch performance appropriately. In this way, whether both lens covers are present or only a single lens cover is present, the device touch screen responds in a suitable manner, maintaining a positive user experience.

With this overview in mind, and turning now to a more detailed discussion in conjunction with the attached figures, the structures and techniques of the present disclosure are shown being implemented in a suitable portable device environment. The following device description is based on embodiments and examples within which the disclosed principles may be implemented and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to personal computers, tablet computers and other devices.

The schematic diagram of FIG. 1 shows an exemplary component group 110 forming an environment within which aspects of the present disclosure may be implemented. In particular, the component group 110 includes exemplary components that may be used in a device wherein the described shielding technique is implemented. It will be appreciated that additional or alternative components may be used in a given implementation depending upon user preference, component availability, price point, and other considerations.

In the illustrated embodiment, the components 110 include a display screen 120 (e.g., a touch screen) which will be the focus of much of the later discussion. The component group 110 may also include applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, and the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The component group 110 may include software and hardware networking components 180 to allow communications to and from the device. Such networking components 180 will typically provide wireless networking functionality, although wired networking may additionally or alternatively be supported. A battery 190 may be included for providing power to the device and its components 110. All or some of the internal components 110 communicate with one another by way of one or more shared or dedicated internal communication links 195, such as an internal bus.

Figure 2:
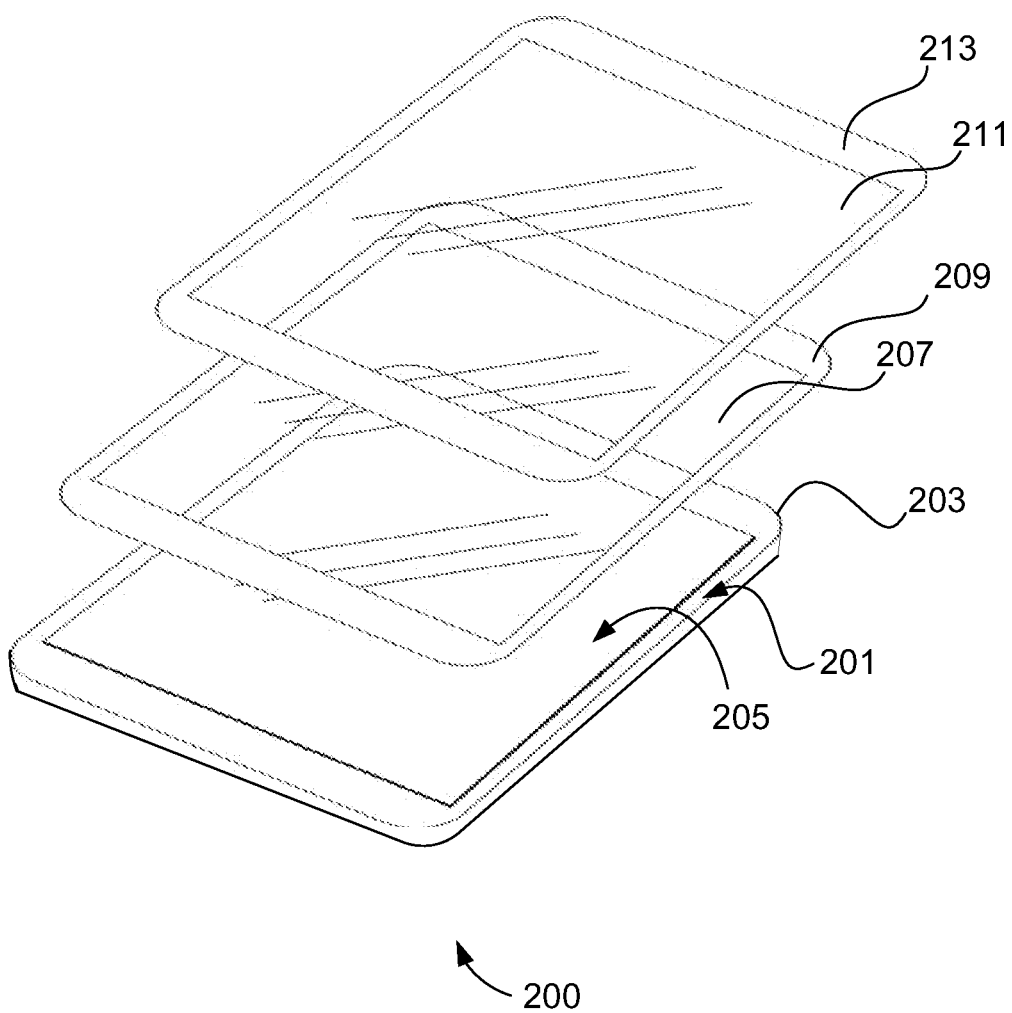
FIG. 2 is a perspective view of a portable communications device in keeping with an embodiment of the disclosed principles.

Turning to FIG. 2, this figure presents a perspective view of a portable communications device 200 in keeping with an embodiment of the disclosed principles. The portable communications device 200 includes a main body 201, which further includes a housing 203. In the illustrated embodiment, a display 205 of the portable communications device 200 is located on a top surface of the portable communications device 200 and is surrounded by a rim of the housing as well as other circuitry and elements such as a camera, flash, optical sensor and so on.

As discussed in overview above, a substantially transparent primary lens 207 is laid over and affixed to the display 205 to protect the display 205. The primary lens 207 may include a largely opaque or non-transparent border 209. In addition to the primary lens 207, a secondary lens 211 is applied to the primary lens 207 of the device 200. In the illustrated embodiment, the secondary lens 211 is laid over and affixed to the primary lens 207. As with the primary lens 207, the secondary lens 211 also includes an opaque or non-transparent border 213.

Figure 3:
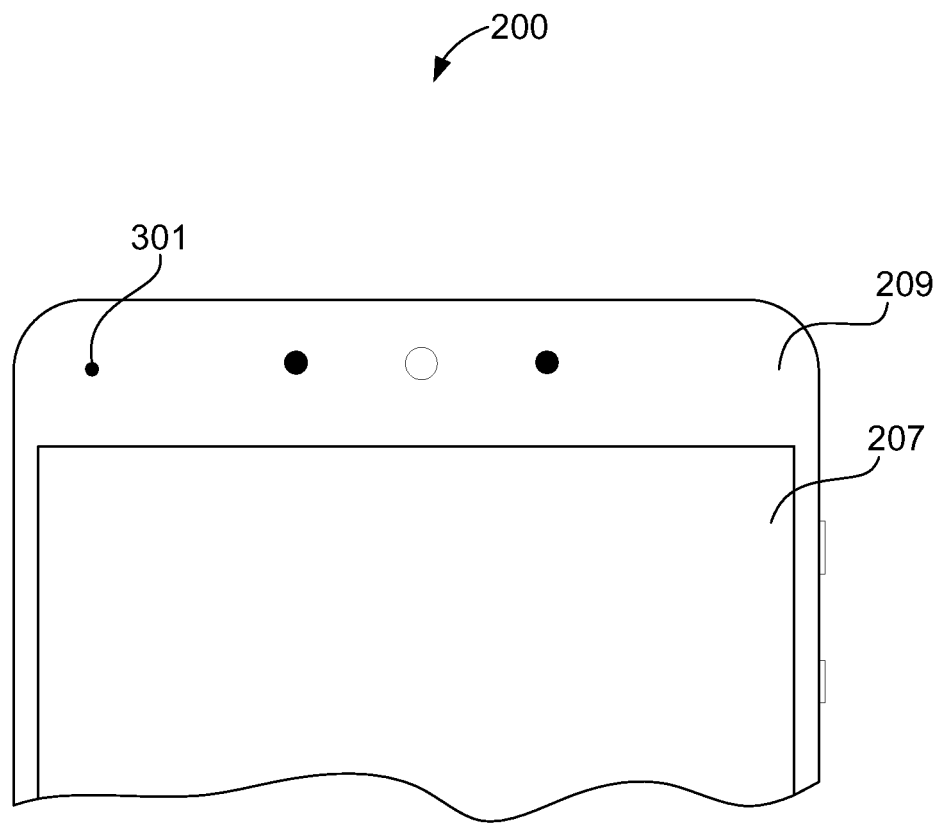
FIG. 3 is a partial front view of the device with only the primary lens present in keeping with an embodiment of the disclosed principles.
Figure 4:
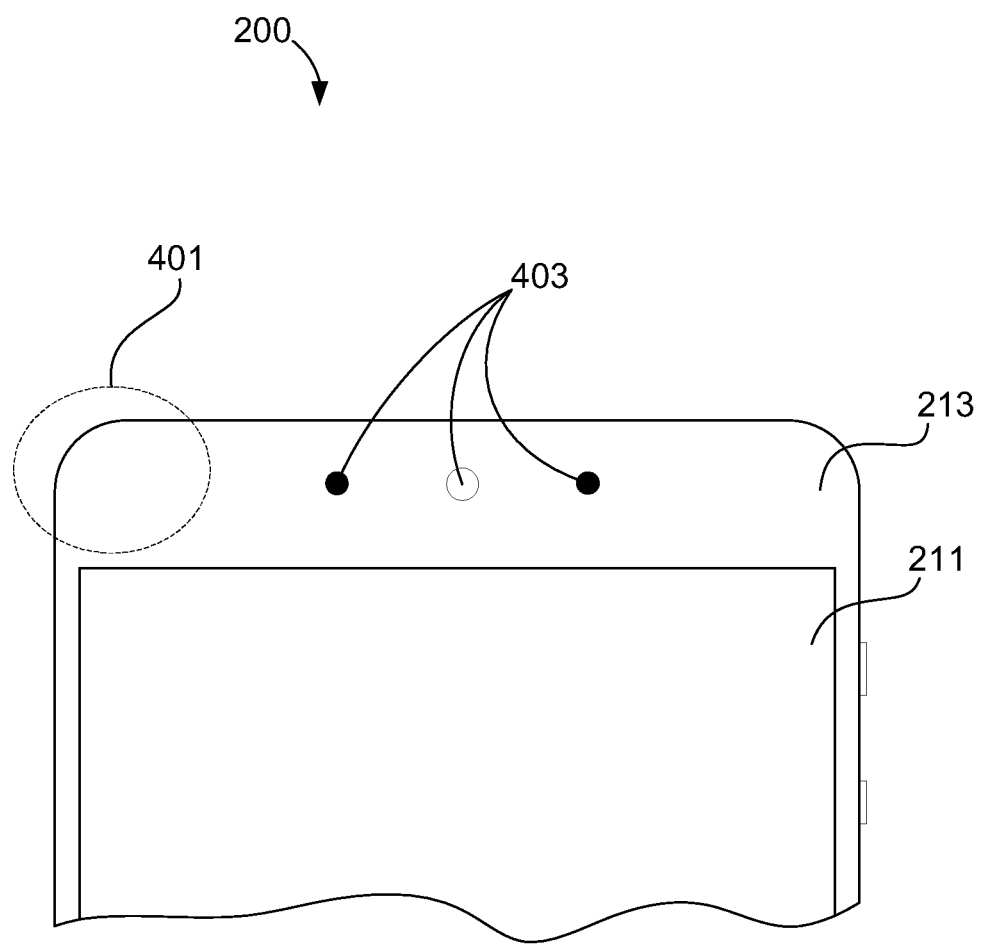
FIG. 4 illustrates the device in partial front view with the secondary lens applied to the front of the primary lens in accordance with an embodiment of the disclosed principles.

As will be shown in greater detail in FIGS. 3 and 4, the opaque or non-transparent borders 209, 213 (also referred to as "decoration") of the primary lens 207 and secondary lens 211 are not identical. Rather, these regions include features enabling the device 200 to detect the presence or absence of the secondary lens 211.

Turning to FIG. 3, this figure shows a partial front view of the device 200 with only the primary lens 207 present. An optical sensor on the device 200 front is exposed via a sensor port 301 in the primary lens 207. In other words, even with the primary lens 207 affixed to the device 200, the optical sensor of the device 200 is still able to sense objects in front of the primary lens 207.

Turning to FIG. 4, this figure illustrates the device 200, again in partial front view, with the secondary lens 211 applied to the front of the primary lens 207. While the border 209 of the primary lens 207 contained the optical sensor port 301 to expose the device's optical sensor, the same region 401 of the secondary lens 211 border 213 is opaque. In this way, the device optical sensor can sense the presence of the secondary lens 211 through the optical sensor port 301 in the border 209 of the primary lens 207. In addition, the border 209 of the primary lens 207 and the border 213 of the secondary lens 211 may both include holes 403 to allow a device camera, flash, or other component to have a line of sight out of the device 200.

As noted above, the primary lens 207 and secondary lens 211 are layered over the device display 205 in sequence when assembled. This aspect may be more clearly seen in the cross-sectional end view of FIG. 5. In the illustrated view, the device housing 201 can be seen in cross-section, including the housing rim 501 previously mentioned. The device display 205 rests within and may be affixed to a lower ledge 503 within the housing rim 501. To this end, a suitable adhesive may be applied to one or both of the inside of the housing ledge 503 and the device display 205 to structurally secure these components to one another.

In addition to being affixed to the housing 201, the device display 205 may be mechanically supported by or affixed to other surfaces or elements within the device 200, e.g., standoffs, brackets and so on. Moreover, once assembled, the device display 205 is further connected electrically to a driver and other components within the device 200 for display and sensing.

Figure 5:
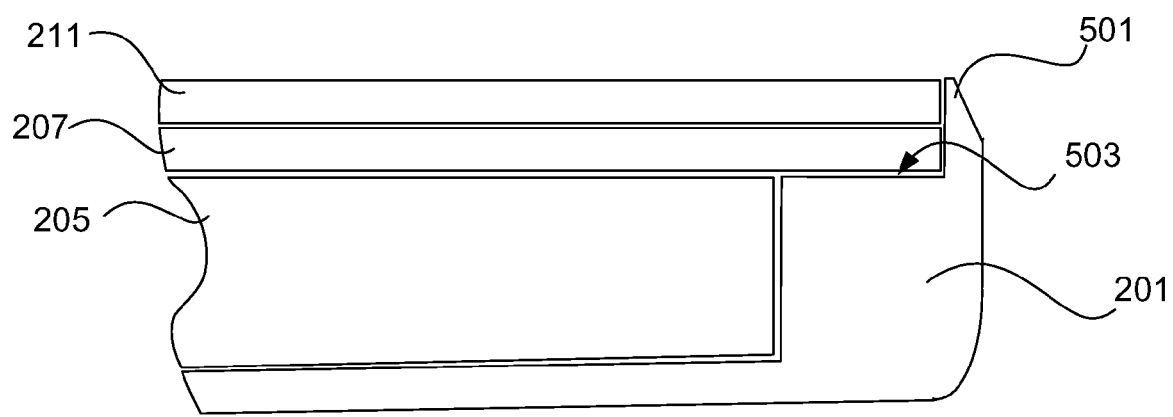
FIG. 5 is a cross-sectional end view of a device in accordance with an embodiment of the disclosed principles.

Continuing with FIG. 5, the primary lens 207 is affixed to the top surface of the device display 205. The securing of the primary lens 207 to the device display 205 may be via an adhesive between the display 205 and the primary lens 207, an adhesive between one or more edges of the primary lens 207 and the surface of the housing ledge 503, or electrostatic or other non-adhesive attractive means. Finally, the secondary lens 211 is applied over the primary lens 207 by the same or other means as used to apply the primary lens 207 to the device display 205.

During assembly of the various lenses 207, 211 onto the display 205 within the housing 201, each layer should be accurately indexed to the others so that, for example, the display areas of each layer coincide and the optical sensor port 301 of the first lens 207 aligns with the optical sensor of the device 200. In an embodiment, the adhesion between the primary lens 207 and the secondary lens 211 is sufficiently weak that removal of the secondary lens 211 from the primary lens 207 will not damage the primary lens 207.

Figure 6:
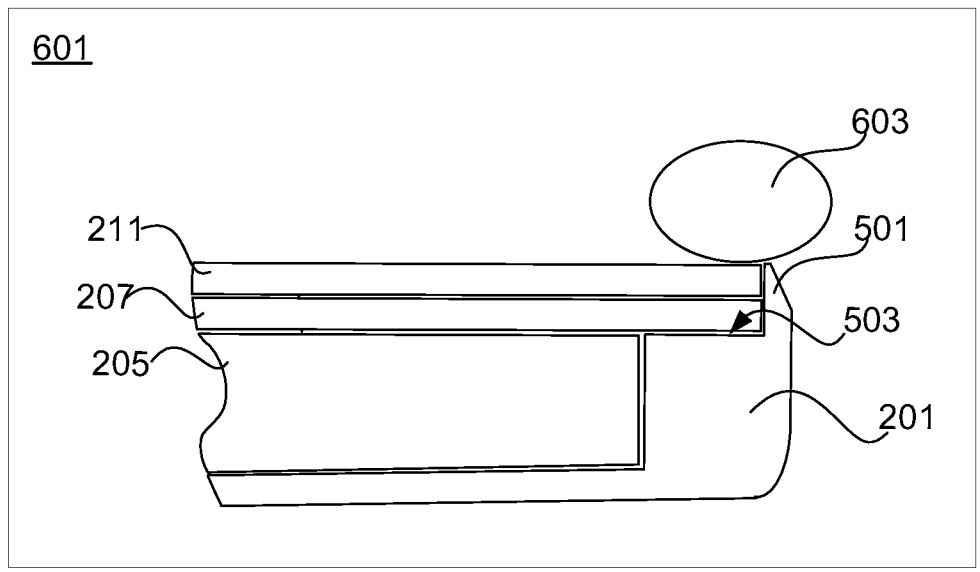
FIG. 6 is a schematic cross-sectional end view of a device showing a user's touch both with and without the secondary lens in accordance with an embodiment of the disclosed principles.
Figure 6:
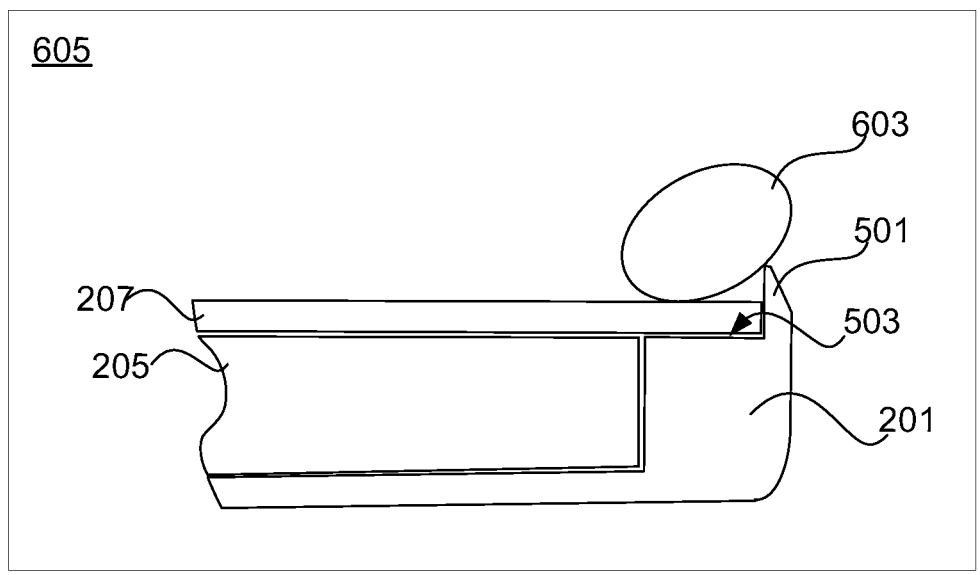

Given that the secondary lens 211 may be removed, e.g., upon breakage thereof, and the primary lens 207 used as the touch surface by the user, optimization of the touch sensing behavior of the device 200 is provided in an embodiment. To clarify the reason for this optimization more clearly, FIG. 6 provides a schematic cross-sectional end view of the device 200, showing a user's touch both with and without the secondary lens 211.

In the first case 601, the user's finger 603 spans both the housing rim 501 and the secondary lens 211. In this case, there is no obstacle to sensing the user's finger across the entire surface of the secondary lens 211 and hence the entire surface of the display 205. However, in the second case 605 shown, the secondary lens 211 has been removed. In this case, the user's finger cannot touch a portion of the primary lens 207 near the joint between the primary lens 207 and the secondary lens 211.

Figure 7:
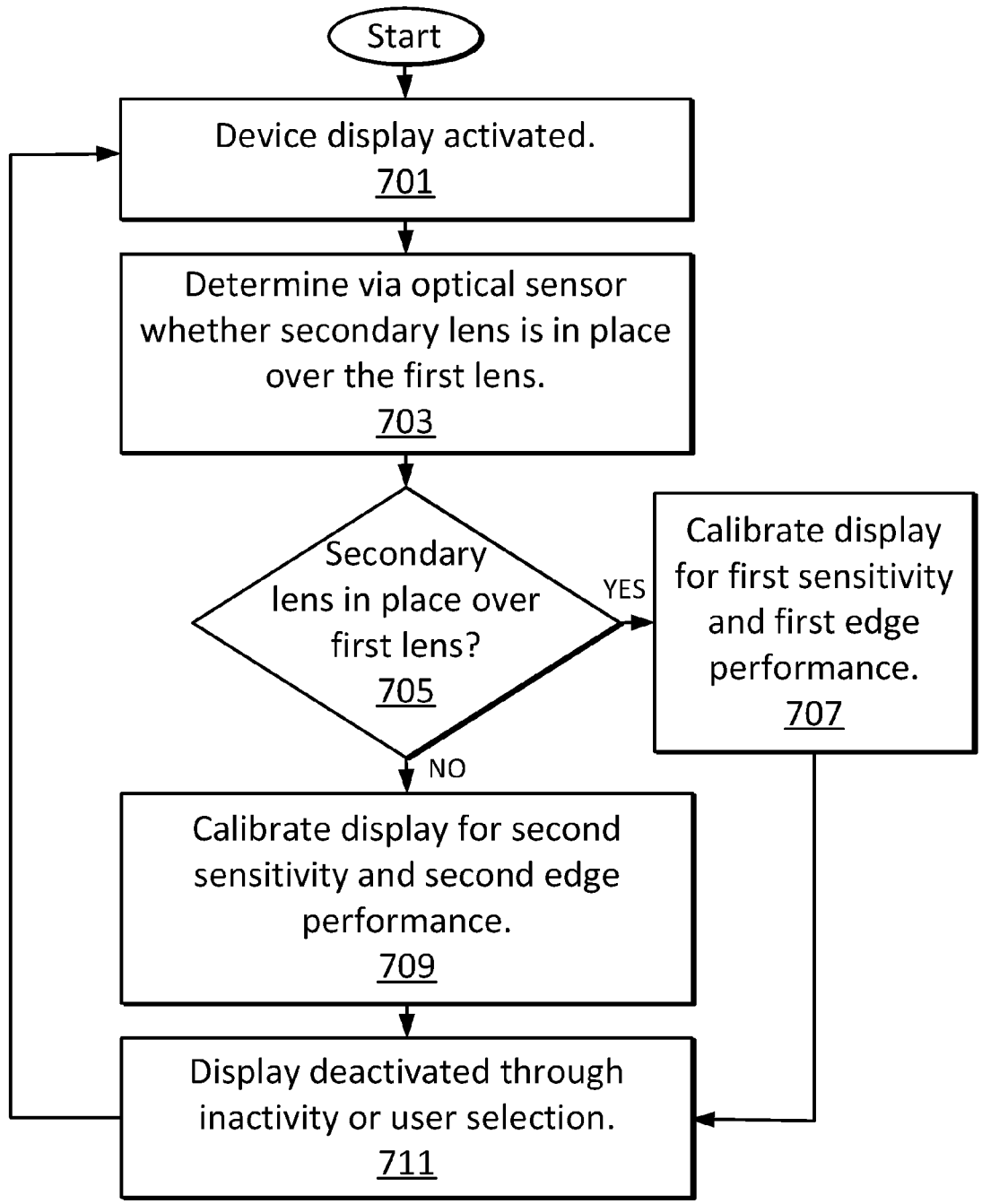
FIG. 7 is a flow chart showing a process for constructing a device in accordance with an embodiment of the disclosed principles.

An exemplary process 700 for optimizing the display sensing characteristics in various situations is shown in the flow chart of FIG. 7. At stage 701 of the process 700, the device display 205 is activated, e.g., by the user touching or turning on the device 200. The device 200 then employs its optical sensor aligned with the optical sensor port 301 of the primary lens 207 at stage 703 to determine whether the secondary lens 211 is in place over the primary lens 207.

At decision stage 705, the device 200, e.g., a controller of the device 200, sends the process 700 to stage 707 if the secondary lens is determined to be present, and otherwise sends the process 700 to stage 709. The device processor calibrates the display 205 for a first sensitivity and first edge performance at stage 707 (i.e., if the secondary lens 211 is determined to be present) and calibrates the display 205 for a second sensitivity and second edge performance at stage 709 (i.e., if the secondary lens 211 is determined not to be present). In either case, once the display 205 is deactivated at stage 711, through inactivity or user selection, the process 700 terminates until the display is again activated.

In this way, the display 205 of the device is protected by two lenses, while allowing for essentially the same user experience if and when the second lens is removed. More generally, it will be appreciated that a system and method for device display optimization have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A portable electronic device comprising:
   a display;
   a primary lens overlying the display;
   a removable secondary lens overlying the primary lens;
   a lens sensor configured to detect the presence of the removable secondary lens, the lens sensor including at least one of a proximity sensor, a light sensor and a capacitive sensor; and
   a touch sensor for detecting a user's touch on one of the primary lens and the removable secondary lens, wherein the touch sensor operates using a selected one of multiple sets of predetermined parameters, wherein the selected one of the multiple sets of predetermined parameters is selected when the display is activated based on the presence of the secondary lens as determined by the lens sensor.

2. The portable electronic device in accordance with claim 1, wherein each set of predetermined parameters includes at least a touch sensitivity parameter.

3. The portable electronic device in accordance with claim 1, wherein each set of predetermined parameters includes at least an edge performance parameter.

4. The portable electronic device in accordance with claim 1, wherein each set of predetermined parameters includes at least a grip suppression parameter.

5. The portable electronic device in accordance with claim 1, wherein the primary lens includes a region of substantially opaque decoration and has an aperture within the substantially opaque decoration for the lens sensor to port through.

6. The portable electronic device in accordance with claim 5, wherein the secondary lens has a substantially opaque decoration over the aperture of the primary lens.

7. The portable electronic device in accordance with claim 1, wherein the device is configured to detect the device being dropped, and in response to record whether the secondary lens is present.

8. A display protection system for a display of a portable electronic device comprising:
   a primary lens overlying the display;
   a removable secondary lens overlying the primary lens;

a lens sensor configured to detect the presence of the removable secondary lens, the lens sensor including at least one of a proximity sensor, a light sensor and a capacitive sensor;

a touch sensor; and a controller configured to adjust the operation of the touch sensor when the lens sensor indicates that the removable secondary lens overlying the primary lens has been removed.

9. The display protection system in accordance with claim 8, wherein the controller is configured to adjust the operation of the touch sensor by adjusting a touch sensitivity parameter.

10. The display protection system in accordance with claim 8, wherein the controller is configured to adjust the operation of the touch sensor by adjusting an edge performance parameter.

11. The display protection system in accordance with claim 8, wherein the controller is configured to adjust the operation of the touch sensor by adjusting a grip suppression parameter.

12. The display protection system in accordance with claim 8, wherein the primary lens includes a region of substantially opaque decoration and has an aperture within the substantially opaque decoration for the lens sensor to port through.

13. The display protection system in accordance with claim 12, wherein the secondary lens has a substantially opaque decoration over the aperture of the primary lens.

14. The display protection system in accordance with claim 8, wherein the device is configured to detect the device being dropped, and in response to record whether the secondary lens is present.

15. A method of constructing a display apparatus for a portable electronic device having a lens sensor, the method comprising:

mounting a display within a housing of the portable electronic device;

affixing a first lens to the mounted display; and mounting a secondary lens to the first lens, wherein the first lens includes an aperture located to overlay the lens sensor and the secondary lens contains an opaque region located to overlay the lens sensor, and wherein the lens sensor is one of a proximity sensor, a light sensor and a capacitive sensor.

* * * * *